(12) United States Patent
Chi et al.

(10) Patent No.: US 9,477,707 B2
(45) Date of Patent: Oct. 25, 2016

(54) SYSTEM AND METHODS FOR PREDICTING QUERY EXECUTION TIME FOR CONCURRENT AND DYNAMIC DATABASE WORKLOADS

(71) Applicant: NEC Laboratories America, Inc., Princeton, NJ (US)

(72) Inventors: Yun Chi, Monte Sereno, CA (US); Wentao Wu, Madison, WI (US); Vahit Hakan Hacigumus, San Jose, CA (US); Jeffrey F. Naughton, Madison, WI (US)

(73) Assignee: NEC Corporation (JP)

( * ) Notice: Subject to any disclaimer, the term of this patent is extended or adjusted under 35 U.S.C. 154(b) by 311 days.

(21) Appl. No.: 14/073,817

(22) Filed: Nov. 6, 2013

(65) Prior Publication Data

US 2014/0214880 A1     Jul. 31, 2014

Related U.S. Application Data

(60) Provisional application No. 61/757,911, filed on Jan. 29, 2013.

(51) Int. Cl.
*G06F 7/00* (2006.01)
*G06F 17/30* (2006.01)

(52) U.S. Cl.
CPC ............................. *G06F 17/30442* (2013.01)

(58) Field of Classification Search
None
See application file for complete search history.

(56) References Cited

U.S. PATENT DOCUMENTS

| 2005/0222965 | A1* | 10/2005 | Chaudhuri | G06F 17/30522 |
| 2009/0070313 | A1* | 3/2009 | Beyer | G06F 17/30386 |
| 2010/0293135 | A1* | 11/2010 | Candea | G06F 17/30442 707/602 |
| 2013/0226903 | A1* | 8/2013 | Wu | G06F 17/30463 707/719 |

* cited by examiner

*Primary Examiner* — Loan T Nguyen
(74) *Attorney, Agent, or Firm* — Joseph Kolodka

(57) ABSTRACT

Systems and methods for predicting query execution time for concurrent and dynamic database workloads include decomposing each query into a sequence of query pipelines based on the query plan from a query optimizer, and predicting an execution time of each pipeline with a progress predictor for a progress chart of query pipelines.

20 Claims, 4 Drawing Sheets

SYSTEM AND METHODS FOR PREDICTING QUERY EXECUTION TIME FOR CONCURRENT AND DYNAMIC DATABASE WORKLOADS

This application is a utility conversion and claims priority to Provisional Application Ser. No. 61/757,911 filed Jan. 29, 2013, the content of which is incorporated by reference.

BACKGROUND

Database as a Service (DaaS) is now becoming more and more popular, as we are moving into the cloud. While DaaS has many desirable features such as elasticity and capital cost reduction, as a new framework it also raises many new challenges that have not been fully addressed before. Among them, one important problem is to predict the execution time of SQL queries. Such a prediction is crucial for DaaS providers to meet the service level agreement (SLA) with their service users. Knowledge about the query execution time is also beneficial to many other database management issues, including query scheduling, admission control, progress monitoring, system sizing, and so on.

Existing solutions mainly focused on predicting the execution time of single standalone SQL queries. Existing solutions to predicting the execution time of concurrent SQL queries, on the other hand, assumed either the query templates or the queries themselves are known beforehand (i.e., they assumed static workloads). Clearly, such an assumption greatly restricts the application scenarios for which these existing approaches can apply. This is because real-world query workloads are usually dynamic, where queries not seen during the training stage need to be handled as well.

SUMMARY

Systems and methods for predicting query execution time for concurrent and dynamic database workloads include decomposing each query into a sequence of query pipelines based on the query plan from a query optimizer, and predicting the execution time of each pipeline with a progress predictor for a progress chart of query pipelines.

Advantages of the preferred embodiments may include one or more of the following. The system achieves higher quality: our prediction model has higher accuracy than the existing approaches. The system achieves higher generality: our prediction model can better handle previous unseen queries. The system is more practical: our invention handles concurrently running queries, which is a more common case in practice. The instant framework is based on analytic modeling rather than machine learning. We first use the optimizer's cost model to estimate the I/O and CPU requirements for each pipeline of each query in isolation, and then use a combination queueing model and buffer pool model that merges the I/O and CPU requests from concurrent queries to predict running times. We compare the instant approach with a conventional machine-learning based approach and experiments show that our analytic-model based approach can lead to competitive and often better prediction accuracy than its machine-learning based counterpart.

DESCRIPTION

Figure 1:
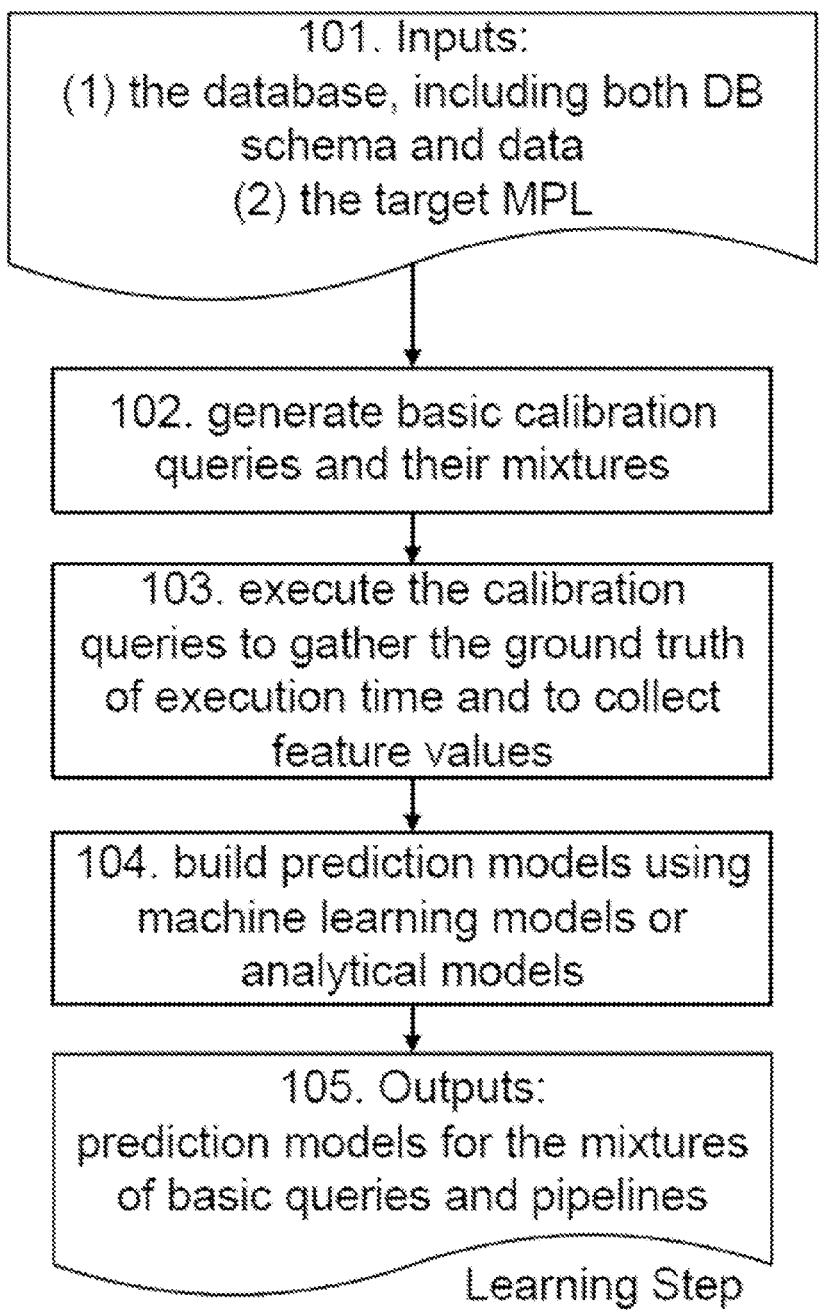
FIG. 1 shows an exemplary learning process for predicting query execution time for concurrent and dynamic database workloads.

FIG. 1 shows an exemplary learning process for predicting query execution time for concurrent and dynamic database workloads. In 101, the process receives inputs such as the database including the DB schema and data as well as the target MPL. In 102, the process generates basic calibration queries and their mixtures. In 103, the process executes the calibration queries to gather the ground truth of the execution time and to collect feature values. In 104, the process builds one or more prediction models using machine learning models or analytical models. In 105, the process generates one or more prediction models for the mixtures of basic queries and pipelines.

Figure 2:
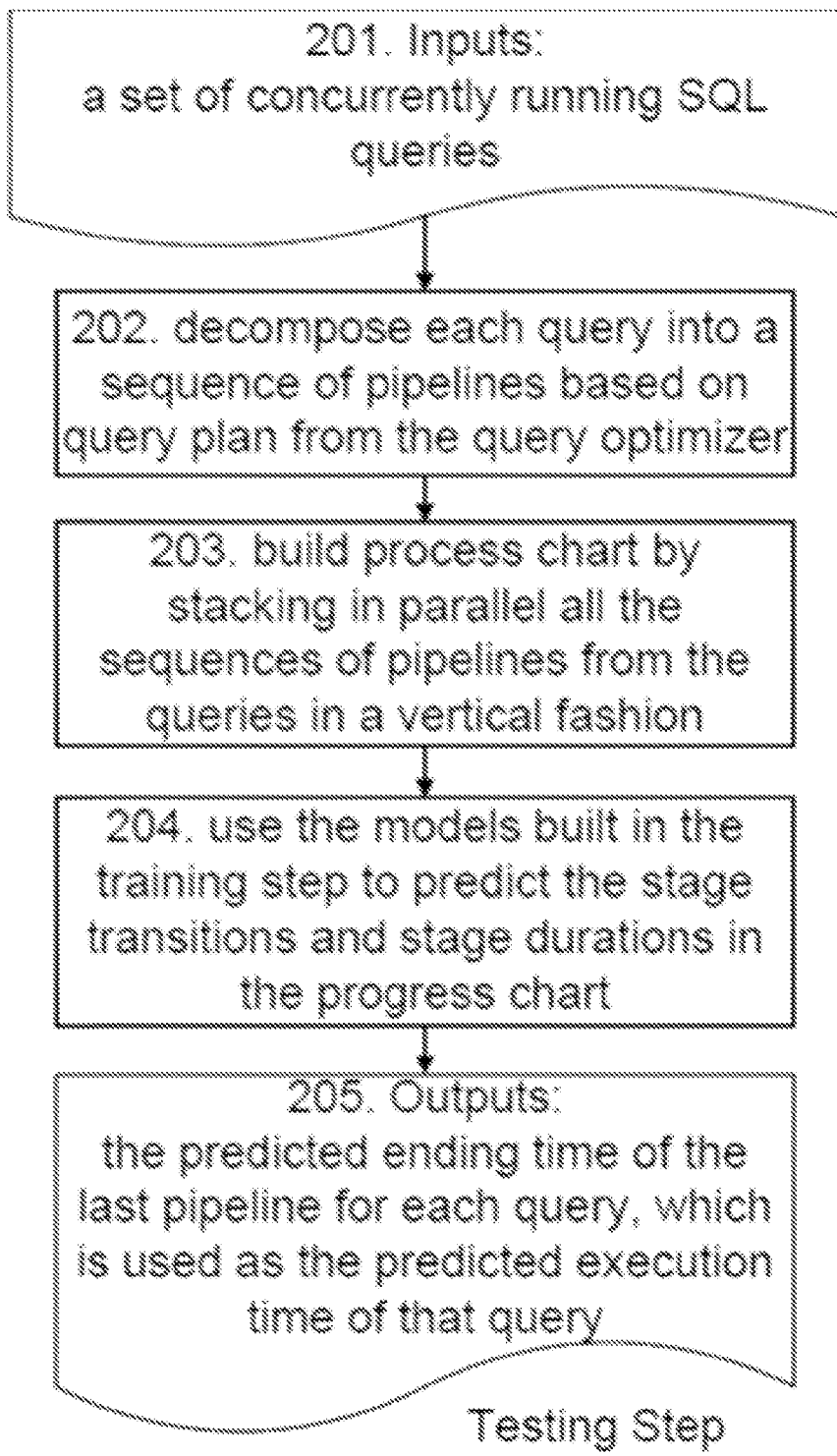
FIG. 2 shows an exemplary testing process for the model learned in FIG. 1

FIG. 2 shows an exemplary testing process for the model learned in FIG. 1. In 201, the process receives a set of concurrently running queries such as SQL queries. In 202, the process decomposes each query into a sequence of pipelines based on the query plan from the query optimizer. In 203, the process builds a process chart by stacking in parallel all sequences of pipelines from the queries in a vertical fashion. In 204, the process applies the models generated in the training operation of FIG. 1 to predict stage transitions and stage durations in the progress chart. In 205, the process generates as outputs the predicted ending time of the last pipeline for each query, which is then used as the predicted execution time of that query.

Figure 3:
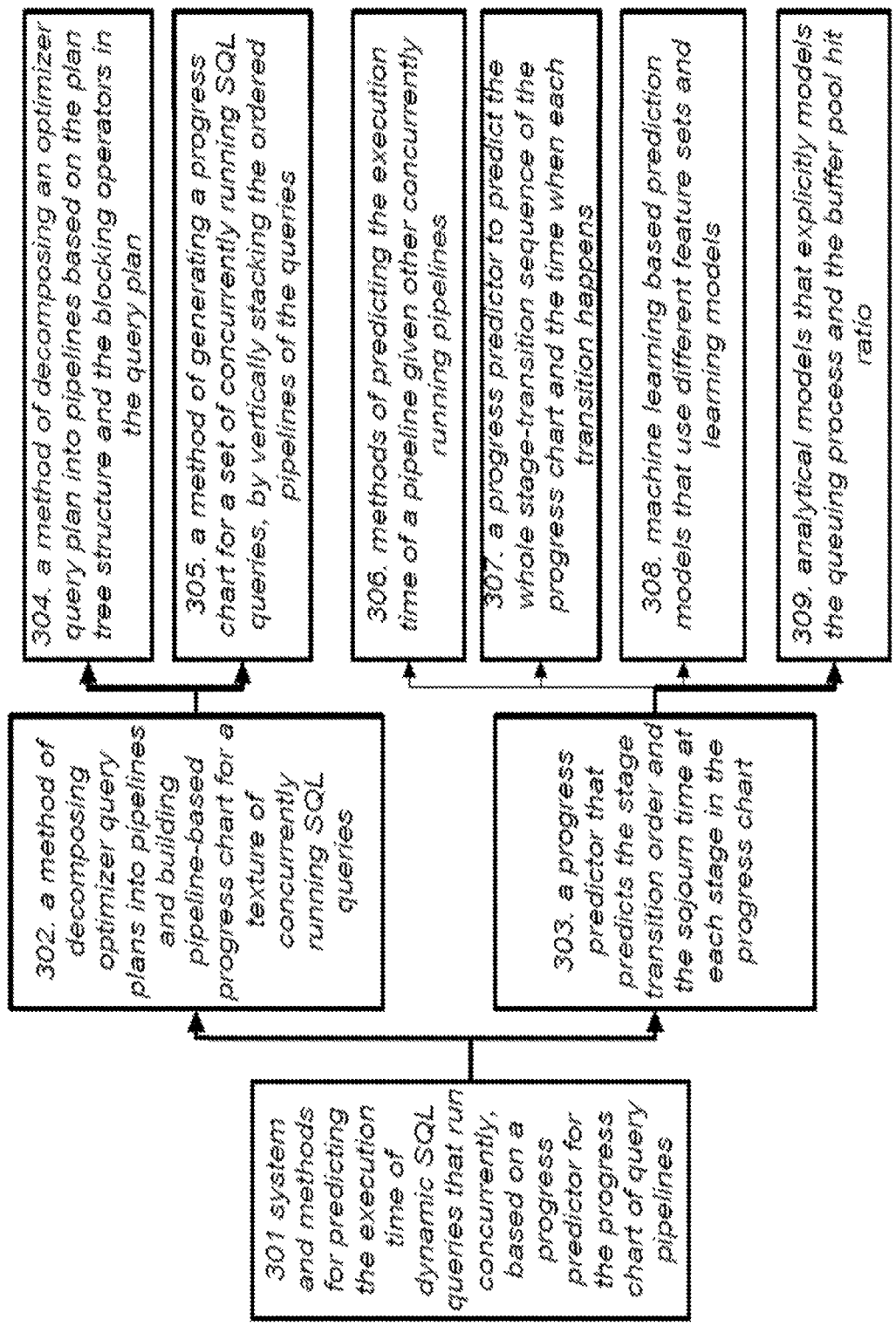
FIG. 3 shows an exemplary process for predicting the execution time of dynamic SQL queries that run concurrently based on a progress predictor.

FIG. 3 shows an exemplary process for predicting the execution time of dynamic SQL queries that run concurrently based on a progress predictor. The process of FIG. 3 shows in 301 a method for predicting query execution time for concurrent and dynamic database workloads by decomposing each query into a sequence of query pipelines based on the query plan from a query optimizer, and predicting an execution time of each pipeline with a progress predictor for a progress chart of query pipelines. In 302, the process performs decomposing an optimizer query plan into one or more pipelines and building a pipeline-based progress chart for a texture of concurrently running queries. In 302, existing software (such as query plan decomposition, pipeline formulation) is applied to a new application of progress prediction and query time prediction. The decomposition of an SQL query into basic pipelines is done based on the query plan. Such decomposition allows our system to handle previously unknown queries, because the basic pipelines can be modeled beforehand. In 304, the process can decompose the optimizer query plan into pipelines based on the plan tree structure and the blocking operators in the plan. In 305, the process generates a progress chart for a set of concurrently running queries by vertically stacking ordered pipelines of the queries.

Turning now to operation 303, wherein the progress predictor predicts a stage transition order and a sojourn time at each stage in the progress chart. The framework uniquely predicts the execution time of SQL queries that are dynamic and concurrently running. The progress chart allows our system to reason about the interactions among concurrently running queries and to make predictions on the execution time of each pipeline and therefore the execution time of each query.

In 306, the process includes predicting the execution time of a pipeline given other concurrently running pipelines. In 307, the progress predictor predicts a whole stage transition sequence of the progress chart and a time when each transition occurs. In 308, the process includes applying machine learning based prediction models that use different feature sets and learning models. In 390, the process includes applying one or more analytical models that models a queuing process and a buffer pool hit ratio. Operations 308 & 309 build machine-learning-based models or analysis-based models for predicting the execution time of each pipeline given other concurrently running pipelines.

The above framework addresses the problem of predicting query execution time for concurrent and dynamic workloads. This new framework can handle dynamic workload. Instead of treating each query as a whole, we decompose each query into a sequence of pipelines based on the query plan from the query optimizer, and then we predict the execution time of each pipeline. The key observation is that for a give database, although there can be infinite number of SQL queries and hence unlimited dynamic query mixtures, the number of pipelines, however, are more tractable. Based on this observation, we view the lifetime of a mixture of queries (whose execution time is to be predicted) as multiple stages, where each stage contains a specific mixture of pipelines. Two separate approaches can be used to predict the execution time of a pipeline when it is mixed with the other pipelines. One approach is based on statistical machine-learning technique, for which we generalize the ideas from previous work to build predictive models without the restricted assumption that the workload queries need to be known beforehand. The other approach is based on analytic models, which explicitly set up formulas and equations that can depict the behavior of the underlying database system, and therefore it naturally does not rely on the particular training queries in use. While analytic models were ancient tools that have been used for several decades in computer system modeling, to the best of our knowledge, we are the first in leveraging them in concurrent query execution time prediction. The execution time of the query can then be computed by summing up the predicted execution time of each of its pipelines. We further conduct extensive experiments to compare the two approaches and to test the effectiveness of the whole framework.

We use an example to illustrate the prediction problem. Suppose that we have three queries $q_1$, $q_2$, and $q_3$ that are concurrently running, which arrive at time $t_1$, $t_2$ and $t_3$, respectively ($t_1 < t_2 < t_3$). Accordingly, we have three prediction problems in total. At $t_1$, we need to predict the execution time for $q_1$. Perfect prediction here would require the information of the upcoming $q_2$ and $q_3$, which is unfortunately not available at $t_1$. So the best prediction for $q_1$ at $t_1$ has to be based on assuming that there will be no query coming before $q_1$ finishes. At $t_2$, $q_2$ joins and we need to make a prediction for both $q_1$ and $q_2$. For $q_1$, we actually predict its remaining execution time, since it has been running for some time. Perfect predictions would again require the knowledge that $q_3$ will arrive, which is unavailable at $t_2$. As a result, the best prediction at $t_2$ needs the assumption that no query will come before $q_1$ and $q_2$ end. The same argument can be further applied to the prediction for $q_1$, $q_2$, and $q_3$ at $t_3$. We therefore define our prediction problem as:

Let Q be a mixture of n queries $Q=\{q_1, \ldots, q_n\}$ that are concurrently running, and assume that no new query will come before Q finishes. Let $s_0$ be the start time of these n queries, and let $f_i$ be the finish time for the query $q_i$. Define $T_i = f_i - s_0$ to be the execution time of $q_i$. The problem we are concerned with in this paper is to build a predictive model M for $\{T_i\}_{i=1}^n$.

To execute a given SQL query, the query optimizer will choose an execution plan for it. A plan is a tree such that each node of the tree is a physical operator, such as sequential scan, sort, or hash join physical operator can be either blocking or nonblocking. An operator is blocking if it cannot produce any output tuple without reading all of its input. For instance, the operator sort is a blocking operator. Based on the notion of blocking/nonblocking operators, the execution of the query can then be divided into multiple pipelines.

By organizing concurrently running operators into pipelines, the original plan can also be viewed as a tree of pipelines. We assume that at any time, only one pipeline of the plan is running in the database system, which is a common way in current database implementations. The execution plan thus defines a partial order over the pipelines. The execution order of the pipelines can usually be obtained by analyzing the information contained in the plan. For example, in our implementation with PostgreSQL, we order the pipelines based on estimating their start times by using the optimizer's running time estimates. We then decompose the plan into a sequence of pipelines, with respect to their execution order.

For the given mixture of queries $q_1, \ldots, q_n$, after decomposing their execution plans into sequences of pipelines, the mixture of queries can be viewed as multiple stages of mixtures of pipelines.

If we could know the finish time $f_{ij}$'s of the pipeline $P_{ij}$'s, then it would be straightforward to compute the execution time of the $P_{ij}$'s and hence the $q_i$. Suppose that we have some model $M_{ppl}$ to predict the execution time of a pipeline by assuming that its neighbor pipelines do not change. We can then progressively determine the next finishing pipeline and therefore its finish time. The details of this idea are presented in Algorithm 1.

Each pipeline $P_{ij}$ is associated with two timestamps: $s_{ij}$, the (predicted) start timestamp of $P_{ij}$; and $f_{ij}$, the (predicted) finish timestamp of $P_{ij}$. The (predicted) execution time of $P_{ij}$ is thus $T_{ij} = f_{ij} - s_{ij}$. We also maintain the remaining ratio $\rho_{ij}^r$ for $P_{ij}$, which is the percentage of $P_{ij}$ that has not been executed yet. Algorithm 1 works as follows. For each query $q_i$, we first call the query optimizer to generate its execution plan $\text{Plan}_i$, and then decompose $\text{Plan}_i$ into a sequence of pipelines. The first pipeline $P_{i1}$ in each $P_i$ is added into the current mixture CurrentMix. Its start timestamp $s_{i1}$ is set to be 0, and its remaining ratio $\rho_{i1}^r$ is set to be 1.0 (line 6 to 10).

Algorithm 1 then proceeds stage by stage. It makes a prediction of the initial mixture of pipelines by calling the given model $M_{ppl}$ (line 13). As long as the current mixture is not empty, it will determine the pipeline $P_{ij}$ with the shortest (predicted) execution time $t_{min}$. The current (virtual) timestamp CurrentTS is forwarded by adding $t_{min}$. The finish time $f_{ij}$ of $P_{ij}$ is then set accordingly, and $P_{ij}$ is removed from the current mixture (line 15 to 20). For each remaining pipeline $P_{ik}$ in the current mixture, we update its remaining ratio $\rho_{ik}^r$ by multiplying it by $$\frac{t_{ik}^r}{t_{ik}},$$

where $t_{ik}$ is the predicted time of $P_{ik}$ (at the beginning time of the current mixture of pipelines), and $t_{ik}^r$ is the remaining (predicted) time of $P_{ik}$ when $P_{ij}$ finishes and exits the current mixture. $t_{ik}^r = t_{ik} - t_{min}$ by definition (line 21 to 24). Intuitively, $$\frac{t_{ik}^r}{t_{ik}}$$

is the relative remaining ratio of $P_{ik}$ at the end of the current mixture. If $P_i$ contains more pipelines after $P_{ij}$ finishes, we add the next one $P_{i(j+1)}$ into the current mixture, set $s_{i(j+1)}$ to be the current timestamp, and set $\rho_{i(j+1)}^r$ to be 1.0 since the pipeline is just about to start (line 25 to 29). Note that now the current mixture changes, due to removing $P_{ij}$ and perhaps adding in $P_{i(j+1)}$. We thus call $M_{ppl}$ again for this new mixture (line 30). However, we need to adjust the prediction $t_{ik}$ for each pipeline, by multiplying it with its remaining ratio $\rho_{ik}^r$ (line 31 to 33). The iteration then repeats by determining the next finishing pipeline. We call this procedure the progressive predictor. The remaining problem is to develop the predictive model $M_{ppl}$ for a mixture of pipelines.

We present the predictive model $M_{ppl}$ for a mixture of pipelines. $M_{ppl}$ is based on the cost models used by query optimizers. PostgreSQL uses a simple cost model for each operator O such that its execution cost (i.e., time) $C_O$ can be expressed as:

$$C_O = n_s \cdot c_s + n_r \cdot c_r + n_t \cdot c_t + n_i \cdot c_i + n_o \cdot c_o. \quad (1)$$

Here $c_s$, $c_r$, $c_t$, $c_i$, and $c_o$ are cost units as follows:
1) $c_s$: seq page cost, the I/O cost to sequentially access a page.
2) $c_r$: random page cost, the I/O cost to randomly access a page.
3) $c_t$: cpu tuple cost, the CPU cost to process a tuple.
4) $c_i$: cpu index tuple cost, the CPU cost to process a tuple via index access.
5) $c_o$: cpu operator cost, the CPU cost to perform an operation such as hash or aggregation.

$n_s$, $n_r$, $n_t$, $n_i$, and $n_o$ are then the number of pages sequentially scanned, the number of pages randomly accessed, and so on, during the execution of O. Our idea is then to apply Equation (1) to each pipeline. Since the n's will not change when the pipelines are concurrently running, the key challenge is to compute the c's in Equation (1). In the following, we present two alternative approaches. One is based on machine-learning techniques, and the other is based on analytic models.

Algorithm 1: Progressive Predictor

Input: $Q = \{q_1, \ldots, q_n\}$, a mixture of n SQL queries; $M_{ppl}$: a model to predict the execution times for a mixture of pipelines
Output: $\{T_i\}_{i=1}^n$, where $T_i$ is the predicted execution time of the query $q_i$

```
1   for 1 ≤ i ≤ n do
2   |   Plan_i ← GetPlan(q_i);
3   |   P_i ← DecomposePlan(Plan_i);
4   end
5
6   CurrentMix ← ∅;
7   for 1 ≤ i ≤ n do
8   |   Add P_{i1} into CurrentMix;
9   |   s_{i1} ← 0;
10  end
11
12  CurrentTS ← 0;
13  MakePrediction(CurrentMix, M_{ppl});
14  while CurrentMix ≠ ∅ do
15  |   t_{min} ← MinPredictedTime(CurrentMix);
```

Algorithm 1: Progressive Predictor

```
16  |   CurrentTS ← CurrentTS + t_{min};
17  |   P_{ij} ← ShortestPipeline(CurrentMix);
18  |   f_{ij} ← CurrentTS;
19  |   T_{ij} ← f_{ij} - s_{ij};
20  |   Remove P_{ij} from CurrentMix;
21  |   foreach P_{ik} ∈ CurrentMix do
22  |   |   t_{ik}^r ← t_{ik} - t_{min};
23  |   |   ρ_{ik}^r ← t_{ik}^r / t_{ik};
24  |   end
25  |   if HasMorePipelines(P_i) then
26  |   |   Add P_{i(j+1)} into CurrentMix;
27  |   |   s_{i(j+1)} ← CurrentTS;
28  |   |   ρ_{i(j+1)}^r ← 1.0;
29  |   end
30  |   MakePrediction(CurrentMix, M_{ppl});
31  |   foreach P_{ik} ∈ CurrentMix do
32  |   |   t_{ik} ← ρ_{ik}^r · t_{ik};
33  |   end
34  end
35
36  for 1 ≤ i ≤ n do
37  |   T_i ← 0;
38  |   foreach pipeline P_{ij} in q_i do
39  |   |   T_i ← T_i + T_{ij};
40  |   end
41  end
42  return {T_i}_{i=1}^n;
```

Next, a machine learning based approach is discussed. The c's are related to the CPU and I/O interactions between pipelines. These two kinds of interactions are different. CPU interactions are usually negative, namely, the pipelines are competing with each other on sharing CPU usage. On the other hand, I/O interactions can be either positive or negative. Therefore, we propose separating the modeling of CPU and I/O interactions.

For CPU interactions, we derive a simple model for the CPU-related cost units $c_t$, $c_i$, and $c_o$. For I/O interactions, we build regression models for the I/O-related cost units $c_s$ and $c_r$. Ideally, we need to handle $c_s$ and $c_r$ separately, and hence we need the ground truth of $c_s$ and $c_r$ in the training data. Unfortunately, while we can know the total I/O time of a query, we have no idea of how much time is spent on sequential and random I/O's respectively. Therefore, we are not able to build separate predictive models for $c_s$ and $c_r$. Instead we build a single model to predict $c_{disk}$, and the I/O time is computed as $(n_s + n_r) c_{disk}$. $c_{disk}$ thus can be thought of as the average I/O time per request.

In the following discussion, we use $c_{cpu}$ to represent $c_t$, $c_i$, or $c_o$. Suppose that we have m CPU cores and n pipelines. Let the time to process one CPU request be $\tau$ for a stand-alone pipeline. If $m \geq n$, then each pipeline can have its own dedicated CPU core, so the CPU time per request for each pipeline is still $\tau$, namely, $c_{cpu} = \tau$. If $m < n$, then we have more pipelines than CPU cores. In this case, we assume that the CPU sharing among pipelines is fair, and the CPU time per request for each pipeline is therefore $$c_{cpu} = \frac{n}{m} \tau.$$

Of course, the model here is simplified. In practice, the CPU sharing among pipelines is not perfect, and some CPU cores may become bottlenecks due to the unbalanced assignment of pipelines to CPU cores. On the other hand, it may be too pessimistic to assume that CPU contention will always happen. In practice, due to CPU and I/O interleaving, not every pipeline is trying to seize the CPU at the same time. So the real CPU contention can be less intense than assumed by the model. We leave the improvement of modeling CPU interactions for future work.

For I/O interactions, we have the following key observation: for a specific database system implementation, the number of possible scan operators is fixed. Basically, there are two kinds of scan operators when accessing a table. One is sequential scan (SS), which directly scans the table, one page after another. The other is index scan (IS), which first finds the relevant search keys via some index, and then fetches the corresponding records from the table if necessary. A particular database system may also have other variants of these two scan operators. For example, PostgreSQL also implements another version of index scan called bitmap index scan (BIS). It first builds a list for the qualified record ID's by looking up the index, and then fetches the corresponding table pages according to their physical order on the disk. If the number of qualified records is big (but still much smaller than the total number of records in the table), then bitmap index scans can be more efficient than pure index scans. Nonetheless, the total number of scan operators in a specific database system is fixed.

We define a scan type to be a specific scan operator over a specific table. It is easy to see that for a specific database system implementation and a specific database schema, the number of possible scan types is fixed. For example, since the TPC-H benchmark database contains 8 tables, and PostgreSQL has 3 scan operators (i.e., SS, IS, and BIS), the number of scan types in this case is 24.

Based on these observations, we can use the previous machine-learning based approach for scan types instead of queries. Specifically, in the training stage, we collect sample mixtures of scans and build regression models. For each mixture of pipelines, we first identify the scans within each pipeline, and then reduce the problem to mixtures of scans so that the regression models can be leveraged. Next, we discuss the feature selection and model selection problem for this learning task.

Next, feature selection is discussed. Let $Q_1, \ldots, Q_m$ be the query types, and let $\{q_1, \ldots, q_n\}$ be the mixture of queries to predict. The feature vector of the mixture could just be $(N_1, \ldots, N_m)$, where $N_1$ is the number of $q_i$'s that are instances of the type $Q_j$. However, this is based on the assumption that the instances of $Q_j$ have very similar execution time. In our case, different instances from the same scan type can have quite different execution time. For example, an index scan with an equality predicate is expected to be much faster than one with a range predicate.

We therefore add additional information from the query plan as features as well. Intuitively, the I/O interactions are related to the tables that the scans touch. If two scans are over different tables, then they will interact negatively due to contention for the buffer pool. However, if two scans are over the same table, then they may also benefit each other due to buffer pool sharing. Moreover, the I/O interactions are also related to the number of I/O's the scans perform. For instance, two huge scans over different tables are likely to suffer more severe buffer pool contention than two small scans, while two huge scans over the same table may perhaps benefit more on buffer pool sharing than two small scans. For these reasons, we use the features to represent an (instance) scan $s_i$ in the mixture, where $tbl_i$ is the table accessed by $s_i$, and $N(s_i)$ is the set of neighbor scans of $s_i$ in the mixture.

We tested representatives of both linear models and nonlinear models. For linear models, we used multivariate linear regression (MLR), and for nonlinear models, we used REP regression trees (REP). We also tested the well-known boosting technique that combines predictions from multiple models, which is generally believed to be better than a single model. Specifically, we used additive regression here, with shallow REP trees as base learners. All of these models can be obtained from the WEKA software package.

To train the model, we constructed a set of training mixtures of queries. The queries were designed to be scans, and we achieved this by using the very simple query template:

SELECT * FROM R WHERE condition

Here R is a table, and condition is a selection predicate over the attributes of R. We used predicates with different selectivities so that the query optimizer could pick different scan operators.

For each scan type, we generated a number of instance scans. For each MPL, we then generated mixtures of instance scans via Latin Hypercube Sampling (LHS). LHS creates a hypercube with the same dimensionality as the given MPL. Each dimension is divided into T equally probable intervals marked with 1, 2, . . . , T, where T is the number of scan types. The interval i represents instances of the scan type i. LHS then selects T sample mixtures such that every value in every dimension appears in exact one mixture. Intuitively, LHS has better coverage of the space of mixtures than uniformly random sampling, given that the same number of samples are selected.

After generating the training mixtures of scans, we need to run them to collect their execution times. Note that, the phrase "the execution time of a scan when it is running with other scans" implicitly assumes that the neighbors will not change during the execution of the scan. To simulate this, we kept on running each scan in the mixture, until every scan finished at least k times (we set k=3 in our experiments). This means, whenever a scan finished, we would immediately run it again. We took the average of the k execution times recorded as the ground truth for the scan.

We assumed for simplicity that the I/O's of a query were only from scans. We now return to this issue. In practice, the I/O's from certain operators (e.g., hash join) due to spilling intermediate results to disk are often not negligible. We have observed in our experiments that completely eliminating these additional I/O's from the model can harm the prediction accuracy by 10% to 30%. Therefore, we choose to incorporate these I/O's into the current model as much as possible. Specifically, we treat the additional I/O's as if they were scans over the underlying tables. For example, PostgreSQL uses the hybrid hash join algorithm. If the partitions produced in the building phase cannot fit in memory, they will be written to disk and read back in the probing phase. This causes additional I/O's. Now suppose that $R \bowtie S$ is a hash join between the table R and S. The additional I/O's are then deemed as additional sequential scans over R and S, respectively.

An analytic model based approach is discussed next. The machine-learning based approach suffers the same problem of infinite number of unknown queries as before. Specifically, the sample space of training data moves from mixtures of queries to mixtures of (instance) scans. Note that, although the number of scan types is finite, each scan type can have infinitely many instances. So the number of mixtures of instance scans is still infinite. It could be imagined (and also verified in our experimental evaluation) that if the queries contain scans not observed during training, then the prediction is unlikely to be good.

In this section, we present a different approach based on analytic models. Specifically, we model the underlying database system with a queueing network. The c's in Equation (1) are equivalent to the resident times per visit of the pipelines within the network, and can be computed with standard queueing-network evaluation techniques. Since the queueing network is incapable of characterizing the cache effect of the buffer pool, we further incorporate an analytic model to predict the buffer pool hit rate.

The queueing network consists of two service centers, one for the disks, and the other for the CPU cores. This is a closed model with a batch workload (i.e., a terminal workload with a think time of zero). The customers of this queueing system are the pipelines in the mixture. In queueing theory terminology, the execution time of a pipeline is its residence time in the queueing network.

If both service centers only contain a single server, then it is straightforward to apply the standard mean value analysis (MVA) technique to solve the model. In practice, we usually use the approximate version of MVA for computational efficiency. The results obtained via exact and approximate MVA are close to each other. The queueing system shown can be described by the following set of equations:

$$R_{k,m} = \tau_k + Y_k \tau_k \sum_{j \neq m} Q_{k,j}, \quad (2)$$

$$Q_{k,j} = \frac{V_{k,j} R_{k,j}}{\sum_{i=1}^{K} V_{i,j} R_{i,j}}, \quad (3)$$

$$Y_k = \frac{1}{C_k} \rho^{4.464(C_k^{0.676}-1)}, \quad (4)$$

$$\rho_k = \frac{\tau_k}{C_k} \sum_{j=1}^{M} \frac{V_{k,j}}{\sum_{i=1}^{K} V_{i,j} R_{i,j}} \quad (5)$$

where $k \in \{cpu, disk\}$, and $1 \leq m \leq M$ (M is the number of customers). Our goal is to compute the residence time $R_{k,m}$ per visit for each customer m at each service center k.

The input parameters of the equations are the $\tau_k$'s and $V_{k,m}$'s. $\tau_k$ is the mean service time per visit to the service center k. For example, $\tau_{disk}$ is the average time for the disk to perform an I/O operation. The $\tau_k$'s should be the same as the cost units used for estimating the execution time of a single standalone query. For PostgreSQL, however, we have 5 cost units but we only need 2 $\tau_k$'s. We address this issue by picking a base cost unit and transform all the other cost units into equivalent amounts of base cost units, with respect to their relative ratios. For example, for the specific machine used in our experiments, we know that $c_r = 11.3 c_s$, which means the time of 1 random I/O is equivalent to 11.3 sequential I/O's. In our experiments, we pick $\tau_{disk} = c_r$ and $\tau_{cpu} = c_t$ as the base I/O and CPU cost unit (the other choices are also OK).

Then the number of I/O and CPU visits $V_{k,m}$ of a pipeline are $$\left(n_r + n_s \cdot \frac{c_s}{c_r}\right)$$

and $$\left(n_t + n_i \cdot \frac{c_i}{c_t} + n_o \cdot \frac{c_o}{c_t}\right).$$

The n's of a pipeline are computed based on the n's of each operator in the pipeline. Specifically, suppose that a pipeline contains l operators $O_1, \ldots, O_l$. Let $n_j$ ($n_j$ can be any of the $n_s$, $n_r$, etc.) be the optimizer's estimate for the operator $O_j$. The corresponding quantity for the pipeline is then $\Sigma_{j=1}^{l} n_j$.

If there is only one server in the service center k (i.e., $C_k = 1$), then $Y_k = 1$ by Equation (4). Equation (2) is then reduced to the case of standard MVA, which basically says that the residence time $R_{k,m}$ is sum of the service time $\tau_k$ and the queueing time $\tau_k \Sigma_{j \neq m} Q_{k,j}$. The expression of the queueing time is intuitively the sum of the queueing time of the customers other than the customer m, each of which in turn is the product of the queue length for each class (i.e., $Q_{k,j}$) and their service time (i.e., $\tau_k$).

When there are multiple servers in the service center, intuitively the queueing time would be less than if there were only one server. The correction factor $Y_k$ is introduced for this purpose. By substituting Equation (3) to (5) into Equation (2), we can obtain a system of nonlinear equations where the only unknowns are the $R_{k,m}$'s. We use the fsolve function of Scilab to solve this system. Any other equivalent solver can be used as well.

The buffer pool model is discussed next. The weakness of the queueing network introduced above is that it does not consider the effect of the buffer pool. Actually, since the buffer pool plays the role of eliminating I/O's, it cannot be viewed as a service center and therefore cannot be modeled within the queueing network. We hence need a special-purpose model here to predict the buffer pool hit rate. Of course, different buffer pool replacement policies need different models. We adapt an analytic model introduced for the "clock" algorithm that is used in PostgreSQL. If a system uses a different algorithm (e.g., LRU, LRU-k, etc.), a different model should be used.

The clock algorithm works as follows. The pages in the buffer pool are organized in a circular queue. Each buffer page has a counter that is set to its maximum value when the page is brought into the buffer pool. On a buffer miss, if the requested page is not in the buffer pool and there is no free page in the buffer, a current buffer page must be selected for replacement. The clock pointer scans the pages to look for a victim. If a page has count 0, then this page is chosen for replacement. If a page has a count larger than 0, then the count is decreased by 1 and the search proceeds. On a buffer hit, the counter of the page is reset to its maximum value.

This procedure can be analyzed by using a Markov chain. Suppose that we have P partitions in the system (we will discuss the notion of partition later). Let $h_p$ be the buffer pool hit rate for the partition p, where $1 \leq p \leq P$. $h_p$ can be obtained by solving the following system of equations:

$$\sum_{p=1}^{P} S_p \left(1 - \frac{1}{\left(1 + \frac{n_0}{m} \frac{r_p}{S_p}\right)^{l_p+1}}\right) - B = 0, \quad (6)$$

$$N_p = S_p \left(1 - \frac{1}{\left(1 + \frac{n_0}{m} \frac{r_p}{S_p}\right)^{l_p+1}}\right), \quad (7)$$

$$h_p = \frac{N_p}{S_p}. \quad (8)$$

By Equation (7) and (8), $$m_p = 1 - h_p = \left[\left(1 + \frac{n_0}{m}\frac{r_p}{S_p}\right)^{l_p+1}\right]^{-1}$$

represents the buffer miss rate of the partition p. Note that $n_0$ can be thought of as the number of buffer misses that can be handled in one clock cycle. As a result, $$\frac{n_0}{m}$$

is the number of buffer accesses (including both buffer hits and misses) in one clock cycle. Hence $$\frac{n_0}{m}\frac{r_p}{S_p}$$

is the expected number of accesses to a page in the partition p. Intuitively, the higher this number is, the more likely the page is in the buffer pool and hence the smaller $m_p$ could be. The expression of $m_p$ thus captures this intuition.

It is easy to see that we can determine the quantity $$\frac{n_0}{m}$$

from Equation (6), since it is the only unknown there. We can then determine out $N_p$ and hence $h_p$ by examining Equation (7) and Equation (8), respectively. To solve $$\frac{n_0}{m}$$

from Equation (6), define $$F(t) = \sum_{p=1}^{P} S_p\left(1 - \frac{1}{\left(1 + t\cdot\frac{r_p}{S_p}\right)^{l_p+1}}\right) - B.$$

We have $F(0)=-B<0$, and $F(+\infty)=\lim_{t\to+\infty}F(t)=(\Sigma_{p=1}^{P}S_p)-B>0$, since we except the size of the database $\Sigma_{p=1}^{P}S_p$ is bigger than the size of the buffer pool B (in pages). Since F(t) is strictly increasing as t increases, we know that there is some $t_0\in[0,+\infty)$ such that $F(t_0)=0$. We can then use a simple but very efficient bisection method to find $t_0$. Here, B, $\{S_p\}_{p=1}^{P}$, and $\{l_p\}_{p=1}^{P}$ are measurable system parameters. $\{r_p\}_{p=1}^{P}$ can be computed based on $\{S_p\}_{p=1}^{P}$ and the number of I/O accesses to each partition, which can be obtained from the query plans.

The remaining issue is how to partition the database. The partitioning should not be arbitrary because the analytic model is derived under the assumption that the access to database pages within a partition is uniform. An accurate partitioning thus requires information about access frequency of each page in the database, which depends on the particular workload to the system. For the TPC-H workload we used in our experiments, since the query templates are designed in some way that a randomly generated query instance is equally likely to touch each page, we simplified the partitioning procedure by treating each TPC-H table as a partition. In a real deployed system, we can further refine the partitioning by monitoring the access patterns of the workload.

---

Algorithm 2: $M_{ppl}$ based on analytic models

---

Input: $\{P_1,...,P_n\}$, a mixture of n pipelines; $M_{queue}$: the queueing model; $M_{buf}$: the buffer pool model
Output: $\{T_i\}_{i=1}^{n}$, where $T_i$ is the predicted execution time of the pipeline $P_i$
1  $\{h_p\}_{p=1}^{P} \leftarrow$ PredictHitRate($M_{buf}$);
2  for $1 \le i \le n$ do
3  | $V_{disk,i} \leftarrow 0$;
4  | foreach partition p accessed by $P_i$ do
5  | | $V_{disk,i} \leftarrow V_{disk,i} + V_{disk,i,p}(1-h_p)$;
6  | end
7  end
8  $\{R_{k,i}\}_{i=1}^{n} \leftarrow$ PredictResTime($M_{queue}$, $\{V_{k,i}\}_{i=1}^{n}$);
9  for $1 \le i \le n$ do
10  | $T_i \leftarrow V_{cpu,i}R_{cpu,i} + V_{disk,i}R_{disk,i}$;
11  end
12  return $\{T_i\}_{i=1}^{n}$;

---

For the above Algorithm 2, we first call the analytic model $M_{buf}$ to make a prediction for the buffer pool hit rate $h_p$ of each partition p (line 1). Since only buffer pool misses will cause actual disk I/O's, we discount the disk visits $V_{disk,i,p}$ of each partition p accessed by the pipeline i with the buffer pool miss rate $(1-h_p)$. The disk visits $V_{disk,i}$ of the pipeline i is the sum of its visits to each partition (line 2 to 7). We then call the queueing model $M_{queue}$ to make a prediction for the residence time per visit of the pipeline i in the service center k, where $k\in\{cpu,disk\}$ (line 8). The predicted execution time $T_i$ for the pipeline i is simply $T_i=V_{cpu,i}R_{cpu,i}+V_{disk,i}R_{disk,i}$ (line 10).

It might be worth noting that, the queueing model here is equivalent to the optimizer's cost model when there is only one single pipeline. To see this, notice that the $\Sigma_{j\ne m}Q_{k,j}$ in the second summand of Equation (2) vanishes if there is only one customer. Therefore, we simply have $R_{k,m}=\tau_k$ in this case. Due to the use of base cost units, no information is lost when multiplying $V_{k,m}$ by $\tau_k$. Specifically, for example, suppose that k=disk. We have $$V_{disk,m}\cdot\tau_{disk} = \left(n_r + n_s\cdot\frac{c_s}{c_r}\right)\cdot c_r = n_r\cdot c_r + n_s\cdot c_s,$$

which is the same as the optimizer's estimate. Since the progressive predictor degenerates to summing up the predicted time of each individual pipeline if there is only one query, the predicted execution time of the query is therefore the same as what if the optimizer's cost model is used. In this regard, for single-query execution time prediction, the analytic-model based approach here can also be viewed as a new predictor based on the optimizer's cost model, with the addition of the buffer pool model.

The system can be used for predicting query execution time for concurrent and dynamic database workloads. Our approach is based on analytic models, for which we first use the optimizer's cost model to estimate the I/O and CPU operators for each individual query, and then use a queueing model to combine these estimates for concurrent queries to predict their execution times. A buffer pool model is also incorporated to account for the cache effect of the buffer pool. We show that our approach is competitive to and often better than a variant of previous machine-learning based approaches, in terms of prediction accuracy. To improve the prediction accuracy, one could either try new machine-learning techniques or develop better analytic models. A hybrid approach combining the merits of both approaches is worth consideration for practical concern, since most database workloads are neither purely static nor purely dynamic.

Figure 4:
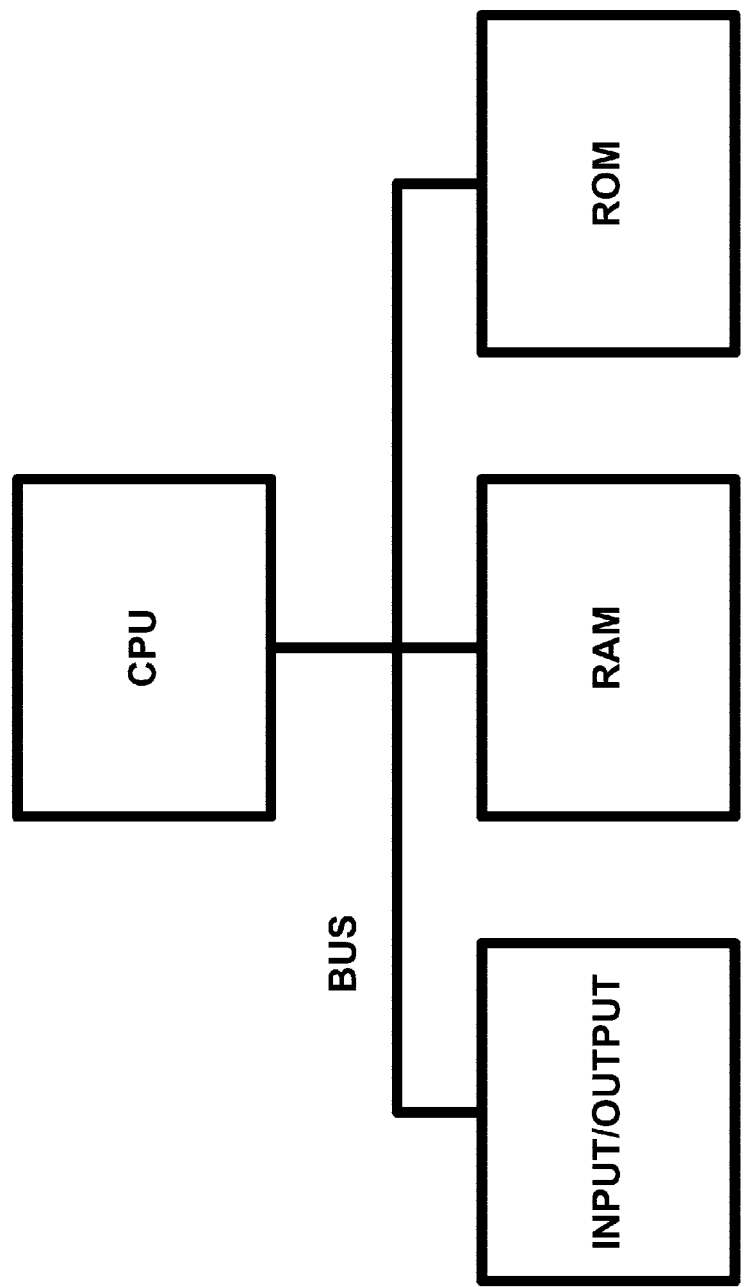
FIG. 4 shows an exemplary computer to run the processes of FIGS. 1-3.

The system may be implemented in hardware, firmware or software, or a combination of the three. FIG. 4 shows an exemplary computer to execute FIGS. 1-3. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for predicting query execution time for concurrent and dynamic database workloads, comprising:
   receiving a plurality of database queries;
   decomposing each query into a sequence of query pipelines based on the query plan from a query optimizer, and
   predicting an execution time $T_i$ for a pipeline i determined as $T_i = V_{cpu,i} R_{cpu,i} + V_{disk,i} R_{disk,j}$ of each pipeline with a progress predictor for a progress chart of query pipelines, with visit V at the disk or the CPU respectively, and residence time R at the disk or the CPU, respectively; and
   modifying the database workload to satisfy a service level agreement with a user.

2. The method of claim 1, comprising determining a lifetime of a mixture of queries whose execution time is to be predicted as multiple stages, where each stage contains a specific mixture of pipelines.

3. The method of claim 1, comprising decomposing an optimizer query plan into one or more pipelines and building a pipeline-based progress chart for a texture of concurrently running queries.

4. The method of claim 3, comprising generating a progress chart for a set of concurrently running queries by vertically stacking ordered pipelines of the queries.

5. The method of claim 1, wherein the progress predictor predicts a stage transition order and a sojourn time at each stage in the progress chart.

6. The method of claim 5, comprising predicting an execution time of a pipeline given other concurrently running pipelines.

7. The method of claim 5, wherein the progress predictor predicts a whole stage transition sequence of the progress chart and a time when each transition occurs.

8. The method of claim 5, comprising applying machine learning based prediction models that use different feature sets and learning models.

9. The method of claim 5, comprising applying one or more analytical models that models a queuing process and a buffer pool hit ratio.

10. The method of claim 9, comprising modeling with a queueing network and resident times per visit of pipelines within a network.

11. A system for predicting query execution time for concurrent and dynamic database workloads, comprising:
    a computer;
    a database executed by the computer;
    code for decomposing each query into a sequence of query pipelines based on the query plan from a query optimizer, and
    code for predicting an execution time $T_i$ for a pipeline i determined as $T_i = V_{cpu,i} R_{cpu,i} + V_{disk,i} R_{disk,i}$ of each pipeline with a progress predictor for a progress chart of query pipelines, with visit V at the disk or the CPU respectively, and residence time R at the disk or the CPU, respectively, and for modifying the database workload to satisfy a service level agreement with a user.

12. The system of claim 11, comprising code for determining a lifetime of a mixture of queries whose execution time is to be predicted as multiple stages, where each stage contains a specific mixture of pipelines.

13. The system of claim 11, comprising code for decomposing an optimizer query plan into one or more pipelines and building a pipeline-based progress chart for a texture of concurrently running queries.

14. The system of claim 13, comprising code for generating a progress chart for a set of concurrently running queries by vertically stacking ordered pipelines of the queries.

15. The system of claim 11, wherein the progress predictor predicts a stage transition order and a sojourn time at each stage in the progress chart.

16. The system of claim 15, comprising code for predicting an execution time of a pipeline given other concurrently running pipelines.

17. The system of claim 15, wherein the progress predictor predicts a whole stage transition sequence of the progress chart and a time when each transition occurs.

18. The system of claim 15, comprising code for applying machine learning based prediction models that use different feature sets and learning models.

19. The system of claim 15, comprising code for applying one or more analytical models that models a queuing process and a buffer pool hit ratio.

20. The system of claim 19, comprising code for modeling with a queueing network and resident times per visit of pipelines within a network.

* * * * *